United States Patent
Headle, Jr.

[11] 3,852,886
[45] Dec. 10, 1974

[54] ANGLE SOLVER PLOT BOARD

[75] Inventor: Herbert W. Headle, Jr., Middletown, R.I.

[73] Assignee: The United States of America as represented by the Secretary of the Navy, Washington, D.C.

[22] Filed: Oct. 19, 1970

[21] Appl. No.: 82,062

[52] U.S. Cl.............. 33/76 V, 33/97, 235/61.5 T
[51] Int. Cl............................................ G06g 7/80
[58] Field of Search............. 33/76, 77, 1 SC, 1 SD, 33/76 VA; 235/61 NV, 61 P, 61 S, 61.5 T, 61.5 DF, 61.5 B, 61.5 R, 186

[56] References Cited
UNITED STATES PATENTS

| | | | |
|---|---|---|---|
| 1,346,273 | 7/1920 | DelSolar | 235/61.5 T |
| 2,717,448 | 9/1955 | Lubin et al. | 33/76 VA |
| 2,767,913 | 10/1956 | Mitchell | 235/61 S |
| 3,083,901 | 4/1963 | Gabriel | 33/97 X |

Primary Examiner—Benjamin A. Borchelt
Assistant Examiner—H. I. Tudor
Attorney, Agent, or Firm—R. S. Sciascia; C. E. Vautrain, Jr.

[57] ABSTRACT

A manual computer for determining torpedo firing angles for single- and two-speed torpedoes is provided. The device includes a base plate, a lower frame cut out to receive a rotor having a circular base and scales which indicate torpedo pre-enable speed and laminar distance offset, an upper frame cut out to receive a slide having scales which indicate target speed across line of sound and torpedo lead angle, an arm which is mounted on and movable with the slide for indicating thousands of yards of enable range and post-enable speed in knots, and a top member. The ultimate angular position of the arm indicates the torpedo lead angle.

4 Claims, 7 Drawing Figures

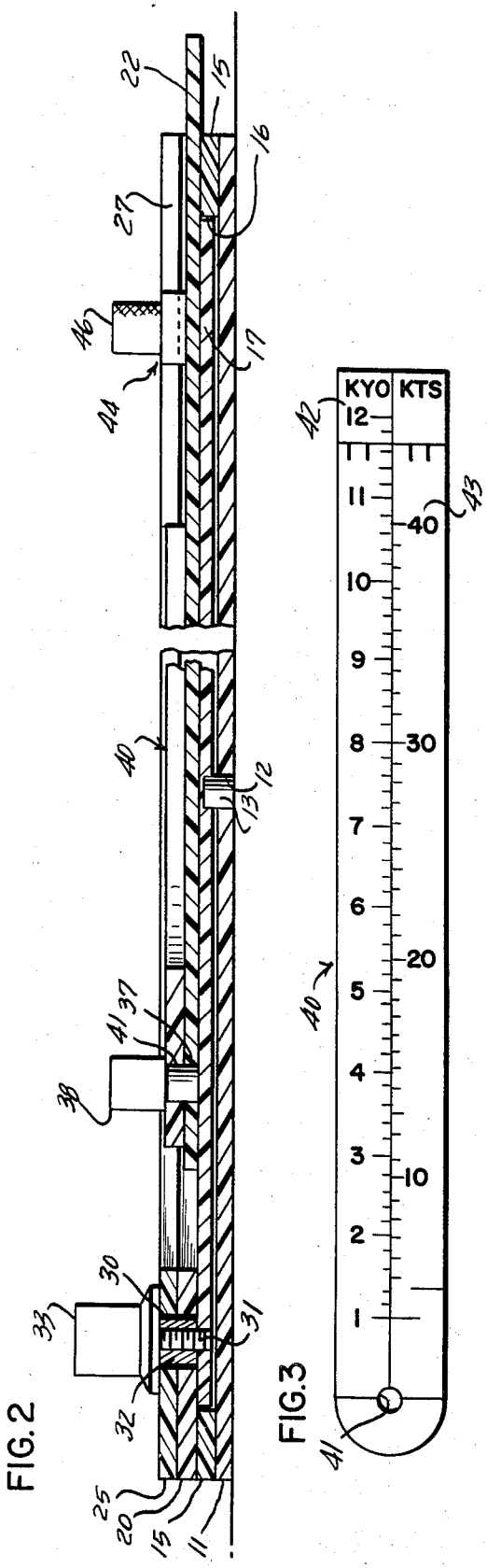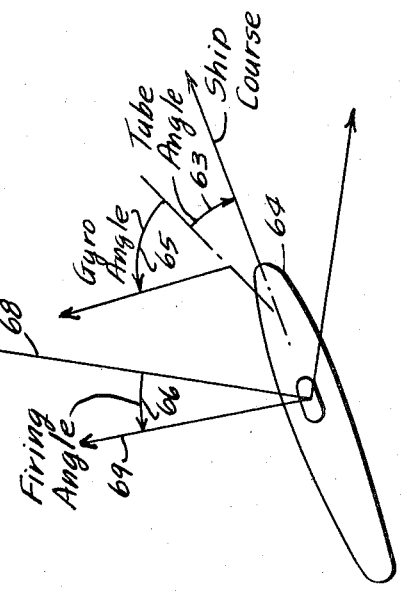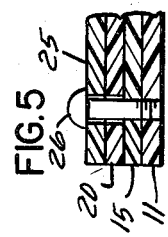

ANGLE SOLVER PLOT BOARD

The invention described herein may be manufactured and used by or for the Government of the United States of America for governmental purposes without the payment of any royalties thereon or therefor.

This invention concerns manual type computers and, more particularly, an angle solver plot board adapted to determine lead angles for both single- and two-speed torpedoes.

In the present state of the torpedo art, torpedoes have been provided with a capability for speed changes and course changes during a run, among other refinements. To properly control these torpedoes, a simple deflection angle plotter is required so that all operations may be accomplished on one manually operated device and a solution reached in a very short period of time. There are no such devices available, hence the development of the present manually operated computer.

The angle solver plot board of the present invention is a seven-element computer with six scales associated therewith, two on a rotor having a semicircular base, two on a rotatable arm and two on a sliding centerpiece. The rotor scales represent and contain torpedo pre-enable speed and a distance factor for introducing different torpedo laminar distances. The slide, which carries the rotatable arm, has vertical lines indicating target speed across the line of sound and an angle scale circumscribed about the pivot axis of the arm for indicating lead angle. The rotating arm has indications on it of torpedo enable range and torpedo post-enable speed. The rotor and slide are locked in place by appropriate knobs when the desired settings have been made.

Accordingly, it is an object of the present invention to provide an angle solver which is adapted to simply and quickly solve multispeed torpedo attach problems.

Another object of the present invention is to provide an angle solver which is easily portable and is sufficiently accurate to serve as a backup torpedo problem solver on all surface and subsurface warships.

A further object of this invention is to provide an angle solver for determining the correct lead angles for either a single- or a two-speed wire-guided torpedo without use of electronic and/or complex mechanical devices.

Other objects, advantages and novel features of the invention will become apparent from the following detailed description thereof when considered in conjunction with the accompanying drawings in which like numerals represent like parts throughout and wherein:

FIG. 2 is an enlarged side elevation in section of the device shown in FIG. 1 taken along a line substantially corresponding to line 2—2 in FIG. 1;

FIG. 3 is an enlarged plan view of the rotatable arm used in connection with the embodiment of FIG. 1;

FIG. 4 is an enlarged sectional view taken along a line substantially corresponding to line 4—4 of FIG. 1 of the means for locking a component of the device shown in FIG. 1 in position;

FIG. 5 is an enlarged sectional view taken along a line substantially corresponding to line 5—5 of FIG. 1 showing the manner in which the assembled layers of the device are secured together;

FIG. 7 is a schematic diagram illustrating the torpedo and own ship angles involved in solving torpedo attack problems.

Figure 1:
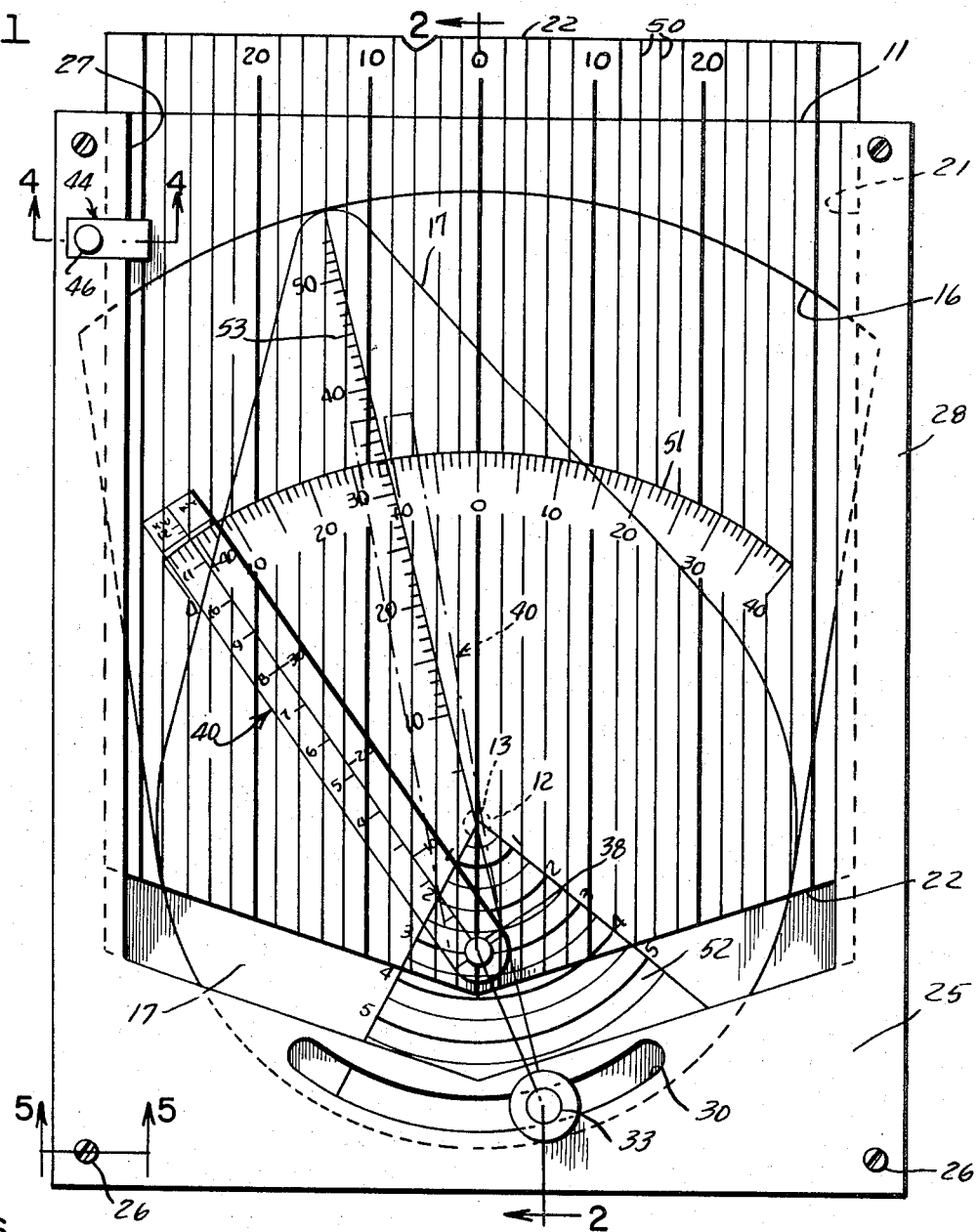
FIG. 1 is a plan view of the assembled angle solver.

Referring to FIGS. 1 and 2, a base plate 11 preferably made of translucent plastic is shown having a drilled hole as indicated at 12 to receive a rotor peg 13. Mounted on base plate 11 is a lower frame member 15 having a cutaway center portion 16 for receiving a rotor 17 which is mounted on peg 13. An upper frame member 20 is mounted on lower frame member 15, member 20 having a cutaway center portion as indicated at 21 for receiving a slide 22 in close fitting relationship. A top member 25 is mounted on and secured to base plate 11 by bolts 26. Top member 25 has a cutaway center portion, as indicated at 27, forming side strips 28 which overlap slide 22. Rotor 17 is tapped as indicated at 30 to receive a rotor knob pin 31 while upper frame member 20 and top member 25 are cored to receive a rotor spacer 32. A rotor locking knob 33 is secured to pin 31 to permit rotor 17 to be locked in selected positions. Slide 22 is provided with a central opening as indicated at 37 for receiving a peg 38, this peg serving as a pivot for a rotatable angle indicating arm 40 which is provided with an opening 41 matching opening 37. A slide lock 44 secures slide 22 in position.

FIG. 3 is a plan view of arm 40, illustrating torpedo enable range scale 42 and torpedo post-enable speed scale 43.

Figure 6:
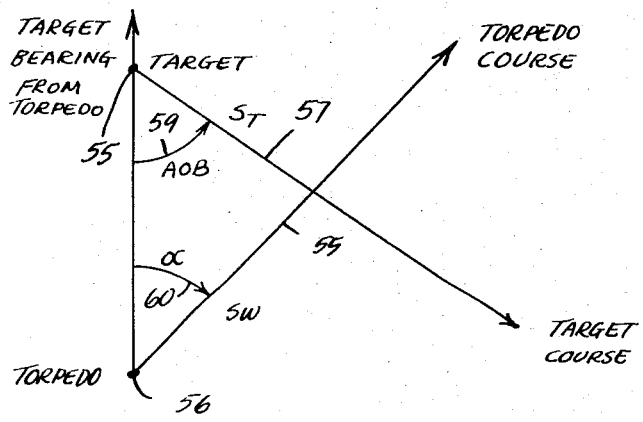
FIG. 6 is a schematic diagram of the triangle solved by the angle solver of FIG. 1.

FIG. 4 shows in detail the manner by which slide 22 is locked in position, a locking screw 46 applying pressure to a tab 47 having a raised edge 48 which presses slide 22 against lower frame member 15 and base plate 11. FIG. 5 illustrates how top member 25 and upper frame member 20 are drilled to receive in free fit bolt 26 which is threaded into lower frame member 15 and base plate 11. FIG. 6 shows the course-speed triangle solved by the angle solver with the target at 55, the torpedo at 56, line 57 representing target course and/or speed, line 58 representing torpedo course and/or speed, angle 59 representing angle-on-the-bow and angle 60 being the lead angle. FIG. 7 presents the various angles employed in solving attack problems, including angle 63 which the torpedo tube makes with the longitudinal centerline of submarine 64, angle 65 representing the gyro angle and angle 66 being the firing angle. Ship's course is indicated at 67, target bearing at 68 and torpedo heading at firing by 69. The firing angle is positive (+) if to the right of the target bearing and negative (−) if to the left while the tube angle is + for a starboard tube and − for a port tube.

Slide 22 has parallel lines 50 thereon indicating target speed across the line of sound (SALOS) to both the left and right of a zero centerline plus an angle scale 51 indicating torpedo firing angle. Rotor 17 has a centrally disposed range scale in the form of a sector 52 in the lower portion thereof by means of which a factor representing torpedo laminar distance is introduced, and extending in the opposite direction a torpedo pre-enable speed scale 53. Speed scales 43, 50 and 53 are equally marked as are range scales 42 and 52.

The assembled device thus includes a slide 22 which is adjusted for laminar distance about the pivot point of arm 40 by moving that pivot point over the arcuate scale indicating appropriate laminar distance on rotor 17, the arm 40 being rotated to various positions with respect to the axis of scale 53 and lines 50 to indicate course angles on scale 51.

The scales on the angle solver plotter board are derived from the law of sines formula $a/\sin \alpha = b/\sin \beta$ or $S_T/\sin \alpha = S_W/\sin AOB$ where $S_T$ is target speed and $S_W$ is weapon speed. The equation can be rearranged conventionally to provide a correct angle of attack for any one quantity where the other three are known.

Before undertaking a solution with the solver, estimates must be made of target range and target SALOS. The appropriate torpedo pre-enable ($S_{W1}$) and post-enable ($S_{W2}$) speeds must also be selected as well as the torpedo laminar distance ($L_D$). The final variables to be selected are whether the torpedo attack should be made in a straight shot or in a turn at enable ("dog leg").

An example of an angle of attack determination is shown in FIG. 6 where the above equation has been arranged to solve for sin $\alpha$. That is, $\sin \alpha = S_T/S_W \sin AOB = SALOS/S_W$. This example can be verified on the angle plot board by using the parameters of a post-enable torpedo speed of 20 knots and a target SALOS of 10 knots. Arm 40 is rotated so that the 20-knot mark on scale 43 is directly over the 10-knot line of scale 50 as shown in FIG. 1. An angle of attack of 30° is indicated on scale 51 by the longitudinal centerline of arm 40.

To solve a problem concerning a torpedo capable of two speeds requires that separate firing angles match the target SALOS for each torpedo speed. These two angles are determined on the plot board by using rotor 17 for the torpedo pre-enable speed value and arm 40 for the enable range value and also for the post-enable torpedo speed value. The torpedo can be fired in either of two ways. First, if the enable range value is one half the estimated target range, the two angles are averaged. The torpedo is then fired on a straight course with a lead angle equal to the averaged angle value, computed as described in the following torpedo problem. The second method involves a turn at the enable point, i.e., a "dog leg" course. The torpedo is fired at the first lead angle to the enable point and turned to the second lead angle computed. These angles are referenced to the target bearing and the second, turn, angle is the difference between these angles. In the "dog leg" shot, a target range value is not needed; however, the target range should be known to be less than the torpedo endurance and greater than the enable distance plus the laminar distance.

Where a gyro angle can be set in a torpedo, the angles determined above must be combined with other angles as shown in FIG. 7 to determine the torpedo gyro angle by the following formula:

Gyro angle = target bearing ($B_T$) + lead angle − torpedo tube angle.

(The lead angle is + if right, − if left of target bearing.)

Applying the formula to the diagram in FIG. 7, a target bearing of 60°, a firing angle of (−) 20° and a tube angle of 24° will result in a torpedo gyro angle of 64°. If no gyro angle can be set in the torpedo, own ship can turn for a zero gyro angle by the following relationships:

$B_T = C_S +$ tube angle − lead angle or

Firing Angle = tube angle − lead angle

The latest target values should be used in the computer and the torpedo should be fired as soon as possible after the values have been determined.

An example of a solution for a straight torpedo shot problem is as follows:

target estimated range = 15,000 yards
target SALOS = 10 kts
$S_{W1}$ = 40 kts
$S_{W2}$ = 20 kts
$L_D$ = 1,500 yards First, calculate the laminar point offset = $S_{W1}/S_{W2} \cdot L_D$ = 40/20 · 1,500 = 3,000 yards, and move slide 22 upward until the pivot axis of arm 40 is over the 3,000 yard arc of scale 52 on rotor 17. Tighten slide lock 44. Second, set $S_{W1}$ (40 kts) on scale 53 of rotor 17 under the target SALOS value (10 kts) on slide 22 and tighten rotor lock 33. Third, rotate arm 40 so that the enable range of 7,500 yards (one half the estimated target range of 15,000 yards) is over the centerline of rotor 17. Record the angle indicated on scale 51, i.e., 9°. Fourth, rotate arm 40 so that $S_{W2}$ (20 kts) on scale 43 is over the target SALOS value (10 kts) on slide 22. Record the final lead angle indicated on scale 51, i.e., 30°. The lead angle is equal to the average of the two angles determined above, i.e., 9° + 30/2 = 19.5° which is the firing angle.

Where the torpedo can be turned at the enable point, the first and second steps are repeated. The next step is to rotate arm 40 so that the appropriate enable range on this arm is over the centerline of rotor 17. This angle is recorded after which the fourth step above is repeated.

The following table lists solutions for a number of different enable distances in turn-at-enable problems. The initial firing angle, or firing lead angle, is negative (−) where the torpedo is fired behind the present target bearing. The torpedo change of course angle is the final angle minus the initial angle.

| Enable Range K yds. | Firing Lead Angle | Final Lead Angle | Torpedo Course Change at Enable |
|---|---|---|---|
| 2 | −7¾° | 30° | 37¾° |
| 3 | 0° | do. | 30° |
| 4 | 3¾° | do. | 26¼° |
| 5 | 6° | do. | 24° |
| 6 | 7½° | do. | 22½° |
| 7 | 8¼° | do. | 21¾° |
| 8 | 9° | do. | 21° |
| 9 | 9¾° | do. | 20¼° |
| 10 | 10¼° | do. | 19¾° |
| 11 | 10¾° | do. | 19¼° |

The present invention thus provides a simple, accurate, rapid and compact means for and method of solving torpedo attack problems. The invention is adapted for use on board any type of ship or craft, providing a reliable backup manual method of angle solving where more sophisticated fire control equipment is unavailable or inoperable. The invention includes the unique concept of using target speed across the line of sound as a basis for angle solving. This concept may be independently incorporated into advanced fire control systems.

Obviously many modifications and variations of the present invention are possible in the light of the above teachings. For example, rotor 17 and slide 22 could be replaced by a plotter having a lined, flat surface (target SALOS) with three adjustable arms mounted thereon for solving problems by triangulation. The slide along the zero target SALOS would be equivalent to scale 52 and would represent laminar offset, the side extending from the base of the zero target SALOS line would be equivalent to arm 40 and would represent $S_{H2}$ and enable distance. And the third side would be equivalent to rotor 17 and would represent torpedo pre-enable speed.

What is claimed is:

1. A device for solving relative motion problems comprising:

an assembled multilayer framework including a rectangular base plate, a lower frame member having its center portion cut away, an upper frame member having its center portion cut away and a top frame member having side margins which overlap the adjacent cutaway portion of the upper frame member;

a rotor disposed in the cutaway portion of said lower frame member,
   said rotor pivotally mounted on said base plate and having a semicircular base portion and a conical top portion adapted for transverse movement between the margins of said top frame member;

a slide disposed in the cutaway portion of said upper frame member;

an arm rotatably mounted in the lower center of said slide;

means for locking said rotor and said slide in position;

a torpedo pre-enable speed scale on the conical top portion of said rotor and a laminar distance offset scale on the semicircular base portion of said rotor;

a target speed across line of sight scale and a torpedo lead angle scale on said slide; and a torpedo enable range scale and a torpedo post-enable speed scale on said arm,
   whereby multispeed torpedo attack problems may be quickly and accurately solved as well as speed, distance and time triangulation problems.

2. A device for solving relative motion problems for multi-speed torpedoes comprising:

a first planar member having torpedo pre-enable speed data and laminar distance offset data thereon;

a second planar member having target speed along line of sound (SALOS) data and torpedo lead angle data thereon positioned over and in registry with said first planar member;

said first planar member pivotable with respect to said second planar member, said second planar member slidable with respect to said first planar member;

a third planar member having torpedo enable range data and torpedo post-enable speed data thereon rotatably mounted on said second planar member; and means for locking said first and second planar members individually in position, whereby laminar distance offset is introduced by longitudinally displacing said second planar member, torpedo pre-enable speed and target SALOS are introduced by rotating said first planar member with respect to said second planar member so that the respective selected values coincide, torpedo enable range is introduced by rotating said third planar member with respect to said second planar member so that the range value is over the longitudinal centerline of said first member, and torpedo post-enable speed is introduced by rotating said third planar member with respect to said second planar member so that the post-enable speed value is over the selected target SALOS value, the angle indicated by the longitudinal axis of said third planar member on the torpedo lead angle scale of said second planar member being the torpedo lead angle.

3. The device of claim 2 wherein the torpedo firing angle for a two-speed torpedo is obtained by averaging lead angles using one half the estimated target range for the enable range and the post-enable speed over the target SALOS.

4. The device of claim 3 wherein the torpedo angle for a torpedo which can be turned at the enable point is obtained by placing the enable range over the longitudinal centerline on the first planar member to determine an initial firing angle, and placing the post-enable speed over the target SALOS value to determine the change of torpedo course at the enable point.

* * * * *